(No Model.)

R. J. & J. P. MACKISON.
HOP CLEANING MACHINE.

No. 525,913.          Patented Sept. 11, 1894.

WITNESSES:

INVENTORS
R. J. Mackison
J. P. Mackison
BY Munn & Co.
ATTORNEYS.

UNITED STATES PATENT OFFICE.

RAPHAEL J. MACKISON AND JOHN P. MACKISON, OF NORTH YAKIMA, WASHINGTON.

HOP-CLEANING MACHINE.

SPECIFICATION forming part of Letters Patent No. 525,913, dated September 11, 1894.

Application filed October 11, 1893. Serial No. 487,852. (No model.)

*To all whom it may concern:*

Be it known that we, RAPHAEL J. MACKISON and JOHN P. MACKISON, of North Yakima, in the county of Yakima and State of Washington, have invented a new and Improved Hop-Cleaning Machine, of which the following is a full, clear, and exact description.

Our invention relates to improvements in machines for cleaning hops; and the object of our invention is to produce a very simple and efficient machine which may be easily operated, which is provided with an inclined bed and a carrying apron to carry away the dirt, dust, leaves and other trash deposited by the hops, which has means for adjusting the bed, which is adapted to clean the apron on its under side, and which is constructed so that perfectly clean hops may be rapidly delivered from one end of the machine.

A further object of our invention is to produce a machine of this kind which is adapted to clean the hops perfectly and without in the least degree injuring or bruising them.

To these ends our invention consists of certain features of construction and combinations of parts, as will be hereinafter described and claimed.

Reference is to be had to the accompanying drawings, forming a part of this specification, in which similar figures of reference indicate corresponding parts in both the views.

Figure 1:
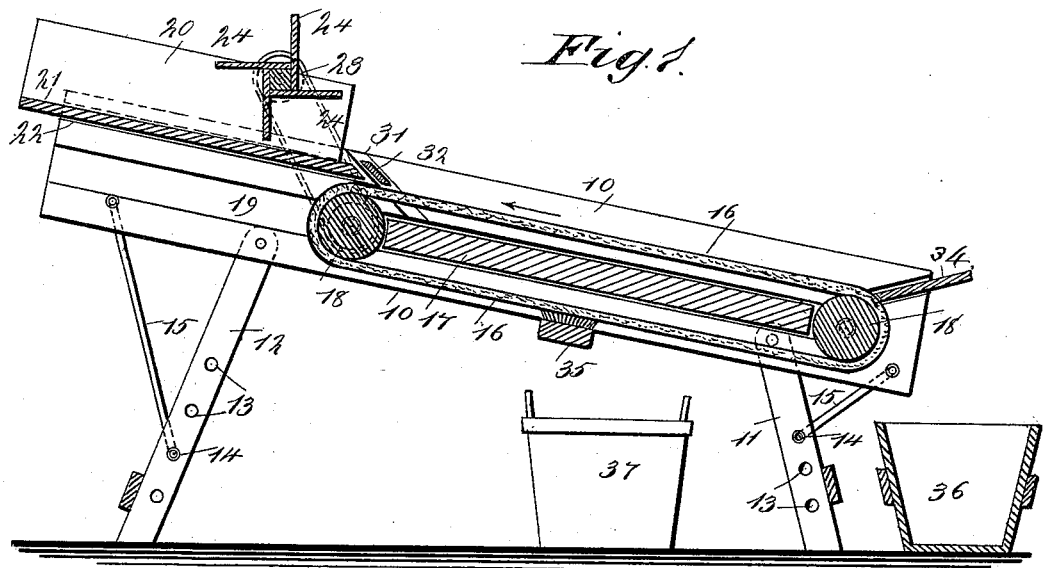
Figure 2:
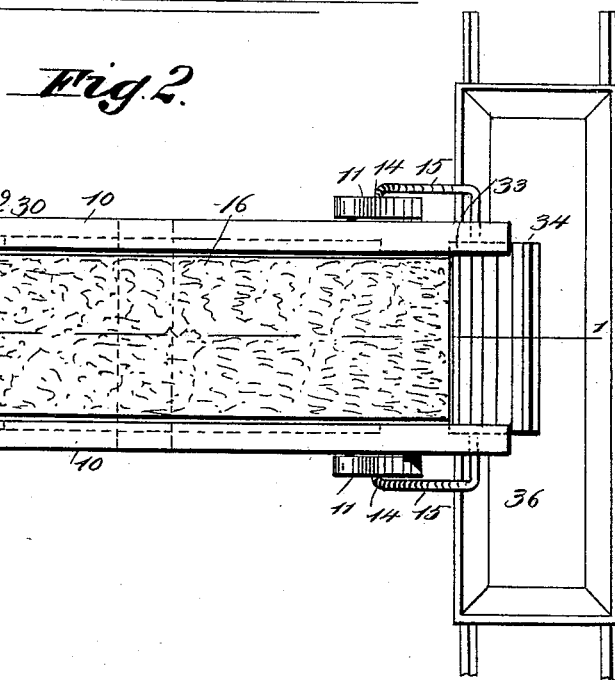

Figure 1 is a vertical longitudinal section on the line 1—1 of Fig. 2 of the machine embodying our invention; and Fig. 2 is a plan view of the machine.

The machine is provided with an elongated frame 10 which is open at the ends and supported on legs 11 and 12, the former being shorter than the latter, and the legs are provided with perforations 13 adapted to receive the bent ends 14 of the brace rods 15 which are pivoted to end portions of the frame and which brace the frame and in connection with the perforated legs permit the inclination of the frame to be readily adjusted.

The frame 10 carries, near its lower end, an endless apron 16 which is preferably of cloth and extends longitudinally in the frame, this carrier turning over the ends of the usual stiffening frame 17 and being carried by rollers 18, the journals of which are mounted in grooves 19 in the sides of the frame. In the upper portion of the frame 10 is a removable sluice box or chute 20, which is open at the ends and the floor 21 of which projects beyond its sides and lies in grooves 22 in the frame 10.

The chute delivers upon the upper end of the carrier or apron 16, and near the lower end of the chute is a paddle wheel 23, the paddles or blades 24 of which project outward so that their edges turn close to the bottom of the chute. The blades 24, as they are rotated, carry forward the hops which are placed in the chute and cause them to be thrown upon the carrier 16. The shaft 25 of the paddle wheel 23 is journaled in the sides of the chute, and one end is provided with a crank 26 by which the wheel may be turned and the other end of the shaft is provided with a pulley 27 which connects by means of a belt 28 with a pulley 29 on the shaft 30 of the upper roller 18, and it will be seen that the carrier or apron 16 will thus be moved by turning the crank 26. Any other suitable means may be employed however, for moving the carrier.

At a point near the upper end of the carrier or apron 16, the frame 10 is provided with diagonal grooves 31 in which is placed a cross bar 32, the upper edge of which is nearly flush with the floor of the chute 20 and the lower edge of which is raised sufficiently from the carrier to permit the broken leaves, dirt and other trash to pass beneath it, but the cross bar prevents the marketable hops from being carried off. The frame 10 is also grooved near the lower end of the carrier, as shown at 33, and in this groove is held a footboard 34 which prevents the hops from passing off at the lower end of the machine. The frame 10 has on its under side a transverse brush 35, the bristles of which engage the under side of the apron 10 and, if desired, a receptacle 37 may be placed beneath the brush to catch the dirt, &c., which the brush scrapes from the apron or carrier 16.

When the machine is to be operated the footboard 34 and headboard 32 are placed in position and the hops dumped into the chute 20 and the wheel 23 revolved. As this revolves it carries the hops forward and downward upon the apron 16, which travels toward the chute 20, and the dirt, broken leaves, &c., are carried by the apron over the upper roller 18 and scraped off by the brush 35 so that clean unbroken hops are left on the apron. When the space between the footboard 34 and the chute 20 is filled with hops, the footboard may be removed and the hops dumped into the receptacle 36.

Having thus described our invention, we claim as new and desire to secure by Letters Patent—

1. A hop cleaning machine, comprising an inclined endless apron or carrier, a chute held to deliver upon the said apron near the upper end thereof, and a cross bar arranged at the foot of the chute and above the upper end of the carrier, a space being formed between the lower edge of said cross bar and the surface of the carrier, substantially as described.

2. A hop cleaning machine, comprising an inclined frame, a carrier or apron mounted longitudinally therein, a chute arranged in the upper portion of the frame and delivering to the surface of the carrier near the upper end thereof, a cross bar arranged at the foot of the chute and above the upper end of the carrier, a space being formed between the lower edge of said cross bar and the surface of the carrier, and a brush arranged beneath the apron and in contact therewith substantially as described.

3. A hop cleaning machine, comprising an inclined frame, an endless belt carrier arranged longitudinally therein, a chute arranged at the upper part of the frame and delivering upon the said carrier near the upper end thereof, a cross bar arranged at the foot of the chute and above the upper end of the carrier, a space being formed between the lower edge of said cross bar and the surface of the carrier, and a paddle wheel arranged within the chute substantially as described.

4. A hop cleaning machine, comprising an inclined frame, an endless carrier arranged longitudinally therein, a chute arranged at the upper end of said frame and delivering upon the carrier near the upper end thereof, a cross bar arranged at the foot of the chute and above the upper end of the carrier, a space being formed between the lower edge of said cross bar and the surface of the carrier, a paddle wheel mounted in the chute, a cleaning brush on the under side of the carrier, a removable foot board near the lower end of the carrier, supporting legs at the ends of the frame, and means for shifting the position of the legs to adjust the inclination of the frame, substantially as described.

RAPHAEL J. MACKISON.
JOHN P. MACKISON.

Witnesses:
HYMAN HARRIS,
SAM LACHMUND.